(12) United States Patent
Park et al.

(10) Patent No.: US 8,774,803 B2
(45) Date of Patent: Jul. 8, 2014

(54) IDLE MODE TRANSITION CONTROL METHOD IN A WIREBAND WIRELESS COMMUNICATION SYSTEM

(75) Inventors: Giwon Park, Gyeonggi-Do (KR); Yongho Kim, Gyeonggi-Do (KR); Kiseon Ryu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/516,418

(22) PCT Filed: Dec. 27, 2010

(86) PCT No.: PCT/KR2010/009368
§ 371 (c)(1),
(2), (4) Date: Jun. 15, 2012

(87) PCT Pub. No.: WO2011/081382
PCT Pub. Date: Jul. 7, 2011

(65) Prior Publication Data
US 2012/0282927 A1 Nov. 8, 2012

Related U.S. Application Data

(60) Provisional application No. 61/290,860, filed on Dec. 29, 2009, provisional application No. 61/291,329, filed on Dec. 30, 2009.

(30) Foreign Application Priority Data

Oct. 25, 2010 (KR) .................. 10-2010-0104267

(51) Int. Cl.
*H04W 4/00* (2009.01)
*H04W 60/06* (2009.01)
(52) U.S. Cl.
CPC .................................... *H04W 60/06* (2013.01)
USPC .................. 455/435.1; 455/517; 370/474

(58) Field of Classification Search
USPC .......... 455/68, 434, 435.1, 456.1–456.5, 458; 370/311, 329, 328, 335
See application file for complete search history.

(56) References Cited

U.S. PATENT DOCUMENTS 8,300,663 B2 * 10/2012 Chion et al. .................. 370/474
2006/0084453 A1 * 4/2006 Kim et al. ..................... 455/517
2006/0154663 A1 * 7/2006 Son et al. ................... 455/435.1
(Continued)

FOREIGN PATENT DOCUMENTS

KR  10-2005-0107258  11/2005
KR  10-2006-0043401   5/2006
KR  10-2006-0081877   7/2006

*Primary Examiner* — Nathan Taylor
(74) *Attorney, Agent, or Firm* — Mckenna Long & Aldridge LLP (57) ABSTRACT

Disclosed is a method of controlling a transition to an idle mode in an operation method for transitioning to an idle mode in a wideband wireless communication system, including: receiving an unsolicited deregistration response message including an action code instructing the terminal to transmit a deregistration request message for a transition to an idle mode and deregistration request message transmission time information from a base station; extracting control information in which a poll bit for reporting whether or not a message has been received is set from the received unsolicited deregistration response message; transmitting a deregistration request message including response information with respect to the extracted control information and a deregistration request code for requesting a transition to an idle mode, to the base station; and receiving a deregistration response message including an action code permitting a transition to an idle mode.

4 Claims, 7 Drawing Sheets

(56) References Cited

U.S. PATENT DOCUMENTS

| | | | |
|---|---|---|---|
| 2006/0160558 A1* | 7/2006 | Kim et al. | 455/522 |
| 2007/0298725 A1* | 12/2007 | Ryu | 455/68 |
| 2008/0056193 A1* | 3/2008 | Bourlas et al. | 370/331 |
| 2008/0070594 A1* | 3/2008 | Barber | 455/458 |
| 2008/0095088 A1* | 4/2008 | Ryu et al. | 370/311 |
| 2008/0153491 A1* | 6/2008 | Cho et al. | 455/435.1 |
| 2009/0227265 A1* | 9/2009 | Kang et al. | 455/456.1 |
| 2010/0041399 A1* | 2/2010 | Kim et al. | 455/434 |
| 2011/0026475 A1* | 2/2011 | Lee et al. | 370/329 |
| 2011/0026495 A1* | 2/2011 | Lee et al. | 370/335 |
| 2011/0039593 A1* | 2/2011 | Lee et al. | 455/515 |
| 2011/0045849 A1* | 2/2011 | Hu et al. | 455/456.5 |
| 2011/0069668 A1* | 3/2011 | Chion et al. | 370/329 |

* cited by examiner

IDLE MODE TRANSITION CONTROL METHOD IN A WIREBAND WIRELESS COMMUNICATION SYSTEM

This application is a 35 U.S.C. §371 National Stage entry of International Application No. PCT/KR2010/009368, filed on Dec. 27, 2010, and claims the benefit of U.S. Provisional Application Nos. 61/290,860, filed Dec. 29, 2009, 61/291,329, filed Dec. 30, 2009, and Korean Patent Application No. 10-2010-0104267, filed Oct. 25, 2010, all of which are incorporated by reference in their entirety herein.

TECHNICAL FIELD

The present invention relates to a wideband wireless communication system and, more particularly, to a method for controlling transition to an idle mode of a terminal.

BACKGROUND ART

In a wideband wireless communication system, an idle mode is supported to reduce power consumption of a mobile terminal. The idle mode starts by any one of a terminal or a serving base station to which the terminal belongs.

Hereinafter, messages used for a terminal to transition to an idle mode will be described in detail.

AAI DREG-REQ and AAI DREG-RSP Message

Table 1 shows deregistration codes of deregistration request (AAI_DREG-REQ) messages and descriptions of respective deregistration request codes.

With reference to Table 1, a terminal sets a deregistration request code De-registration_Request_Code) of a deregistration request message to '01' and transmits the same to a base station to request that the terminal will transition to an idle mode. Also, when the terminal receives an unsolicited registration response message including an operation code '05' instructing the terminal to transmit a deregistration request message for a transition to an idle mode from the BS, the terminal sets the deregistration request code (De-registration_Request_Code) to '02' of the deregistration request message and transmits the same to the base station in response thereto.

Table 2 below shows action codes of a deregistration response (AAI_DREG-RSP) and descriptions of operations of a terminal instructed by respective action codes.

TABLE 1

| M/O | Attributes/ Array of attributes | Size(bits) | Value/Note | Conditions |
|---|---|---|---|---|
| M | De-registration_Request_Code | 3 | Used to indicate the purpose of this message<br>0x00: AMS deregistration request from ABS and network<br>0x01: request for AMS deregistration from serving ABS and initiation of AMS idle mode.<br>0x02: response for the unsolicited AAI_DREG-RSP message with action code 0x05 by the ABS.<br>0x03: reject for the unsolicited AAI_DREG-RSP message with action code 0x05 by the ABS. This code is applicable only when an AMS has a pending UL data to transmit.<br>0x04: request for AMS deregistration from serving ABS to enter DCR mode<br>0x05: response for the unsolicited AAI_DREG-RSP message with action code 0x00, 0x01, 0x02 or 0x03<br>0x06-0x07: reserved | N.A. |

TABLE 2

| M/O | Attributes/ Array of attributes | Size (bits) | Value/Note | Conditions |
|---|---|---|---|---|
| M | Action code | 4 | Used to indicate the purpose of this message<br>0x00: AMS shall immediately terminate service with the ABS and should attempt network entry at another ABS<br>0x01: AMS shall listen to the current ABS but shall not transmit until a RES-CMD message or AAI_DREG-RSP message with action code 0x02 or 0x03 is received.<br>0x02: AMS shall listen to the current ABS but only transmit on the control connection.<br>0x03: AMS shall return to normal operation and may transmit on any of its active connections.<br>0x04: This option is valid in response to a AAI_DREG-REQ message with De-Registration Request Code = 0x00. The AMS shall terminate current Normal Operation with the ABS.<br>0x05: AMS shall begin idle mode initiation: a) to signal AMS to begin idle mode in unsolicited manner or b) to allow AMS to transmit AMS-initiated idle mode request at the REQ-Duration expiration<br>0x06: This option is valid only in response to a AAI_DREG-REQ message with De-Registration Code 0x01: a) to reject AMS-initiated idle mode request or b) to allow AMS to transmit AMS-initiated idle mode request at the REQ-Duration expiration<br>0x07: This option is valid in response to a AAI_DREG-REQ message with De-registration-request-code = 0x01 to allow AMS-initiated idle mode request.<br>0x08: This option is valid only in response to an AAI_DREG-REQ message with De-Registration Request Code 0x04 to allow retention of the AMS's connection information<br>0x09: This option is valid only in response to an AAI_DREG-REQ message with De-Registration Request Code 0x04 to reject retention of the AMS's connection information.<br>0x10-0x15: reserved | N.A. |

With reference to Table 2, when the base sets the action code to '05' and transmits a deregistration response message to the terminal, the terminal starts a transition to an idle mode in an unsolicited manner or transmits a deregistration request message for requesting a transition to an idle mode after the expiry of REQ-Duration. Namely, the action code '05' is a code instructing the terminal to start to transition to an idle mode.

Also, when the base station receives a deregistration request message including a deregistration request code '01' from the terminal, the base station sets an action code '07' and transmits a deregistration response message to the terminal in response thereto.

MCEH (MAC Control Extended Header), MAEH (MAC Control Message ACK Extended Header) and AAI MSG-ACK Message Table 3 below shows an example of a format of an MCEH (MAC Control Extended Header).

TABLE 3

| Syntax | Size (bit) | Notes |
|---|---|---|
| MCEH ( ) { | | |
| Type | 4 | Extended header type = 0b0010 (MCEH Type) |
| Control Connection Channel ID (CCC ID) | 1 | Channel ID to identify separate fragmentation/reassembly state machines<br>0: channel 1<br>1: channel 2 |
| Polling | 1 | 0 = no acknowledgement required<br>1 = acknowledge required upon receiving the MAC message |
| FC | 2 | Fragmentation control (see Table 669) |
| SN | 8 | Payload sequence number, SN is maintained per CCC ID, the 'SN' value increments by one (modulo 256) sequentially. |
| } | | |

With reference to Table 3, the MCEH includes a polling parameter indicating a response with respect to whether or not a message has been received. For example, when a poll bit is set to '1', it requests a response with respect to a message reception, and when the poll bit is set to '0', it does not request a response with respect to a message reception.

Table 4 below shows an example of a format of an MAEH (MAC Control message ACK Extended Header).

TABLE 4

| Syntax | Size (bits) | Notes |
|---|---|---|
| MAEH ( ) { | | |
| Type | 4 | Extended header type = 0b0100 (MAEH type) |
| MAEH sub-type | 1 | 0b0: Indicates reception of a control message |
| | | 0b1: Indicates reception of a Service Specific Scheduling Control header |
| If (MAEH sub-type == 0b0) { | | |
| ACK_SN | 6 | SN retrieved from the MCEH of the MAC PDU with the Polling bit set to 1 |
| Control Connection Channel ID (CCC ID) | 1 | Control Connection Channel ID (CCC ID) that the MAC control message is received. |
| } | | |
| Reserved | Variable | For byte alignment |
| } | | |

The MAEH may be used by a terminal or a base station in order to instruct a response with respect to a received MAC control message. When the base station or the terminal receives a MAC control message in which a poll bit of the MCEH is set to '1', or a portion of the MAC control message, the base station or the terminal transmits the MAEH as an acknowledgement thereto.

Table 5 below shows an example of an AAI_MSG-ACK message format.

TABLE 5

| M/O | Attributes/ Array of attributes | Size (bits) | Value/Note | Conditions |
|---|---|---|---|---|
| M | ACK_SN | 6 | SN retrieved from MCEH of the received MAC PDU. | N.A. |
| M | CCC ID | 1 | Control Connection Channel ID (CCC ID) that the MAC management message is received. | N.A. |

The base station or the terminal may use an AAI_MSG-ACK message in order to indicate a reception of a MAC management. When the base station or the terminal receives a MAC message including the MCEH in which a poll bit is set to '1', the base station or the terminal transmits an AAI_MSG-ACK message as an acknowledgement thereto.

AMS Initiated Idle Mode Entry

Figure 1:
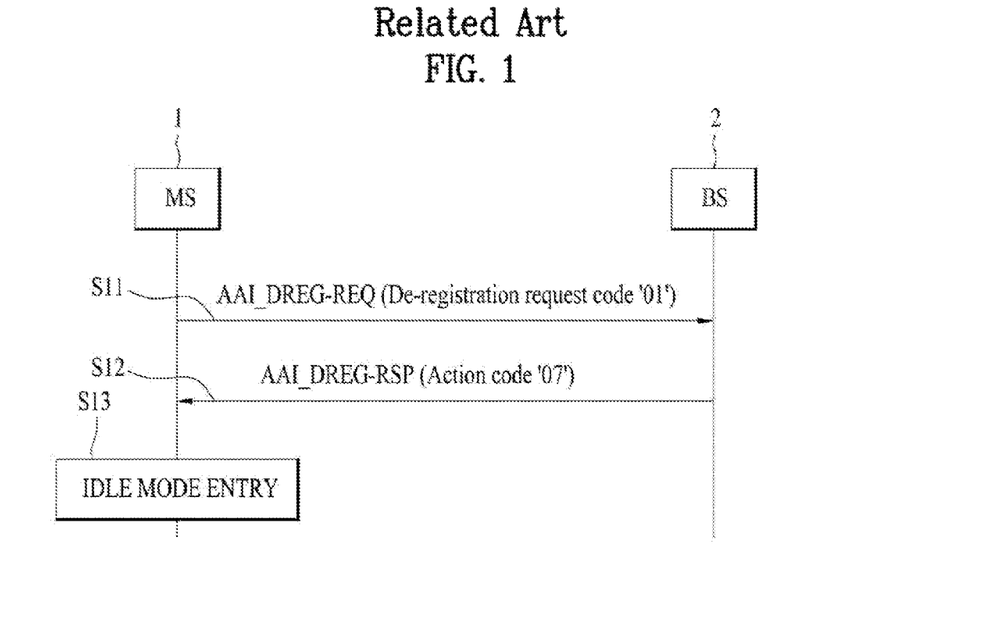
FIG. 1 is a flow chart illustrating a process of transitioning to an idle mode started by a terminal according to the related art.

FIG. 1 is a flow chart illustrating a process of transitioning to an idle mode started by a terminal according to the related art.

With reference to FIG. 1, when the terminal wants to transition to an idle mode, the terminal transmits a deregistration request (DREG-REQ) message including a deregistration request code '01' to the base station (step S11). The base station a deregistration (DREG-RSP) message including an action code '07' in response to the DREG-REQ message which has been transmitted from the terminal (step S12). Upon receiving the DREG-RSP message, the terminal transitions to an idle mode (step S13).

Type 1 ABS Initiated Idle Mode Entry

Figure 2:
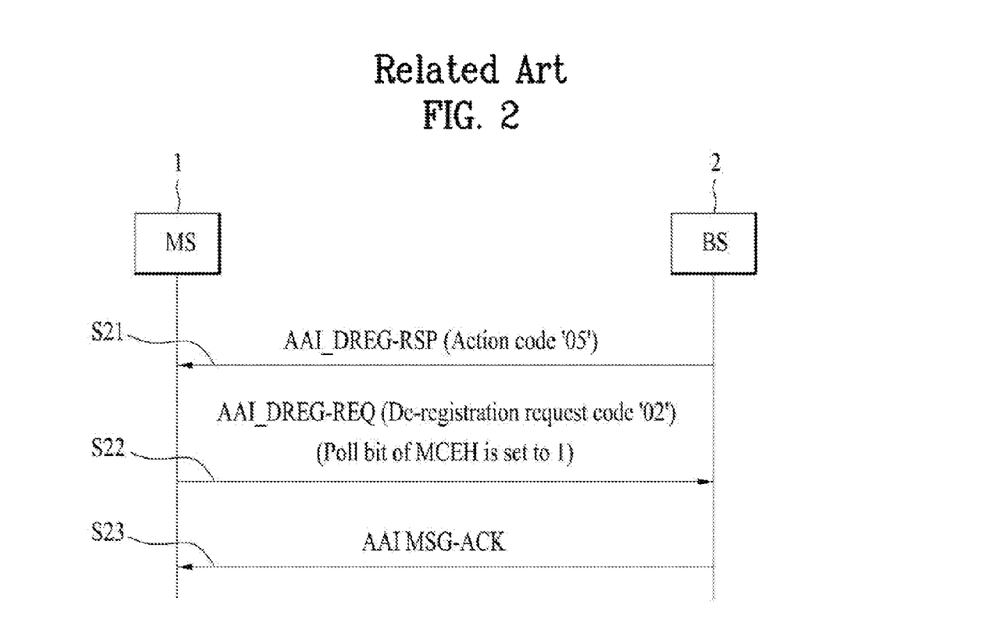
FIG. 2 is a flow chart illustrating a process of transitioning to an idle mode by Type 1 ABS initiation according to the related art.

FIG. 2 is a flow chart illustrating a process of transitioning to an idle mode by Type 1 ABS initiation according to the related art.

With reference to FIG. 2, in order to instruct the terminal to transition to an AMS initiated idle mode, the base station transmits a DREG-RSP message including an action code '05' to the terminal (step S21). Upon receiving the DREG-RSP message, the terminal transmits a DREG-REQ (including deregistration request code '02') in which a poll bit in the MCEH (MAC Control Extended Header) is set to '1' to the base station in response thereto (step S22). Upon receiving the DREG-REQ message, the base station transmits an AAI_MSG-ACK message to the terminal (step S23).

Type 2 ABS Initiated Idle Mode Entry

Figure 3:
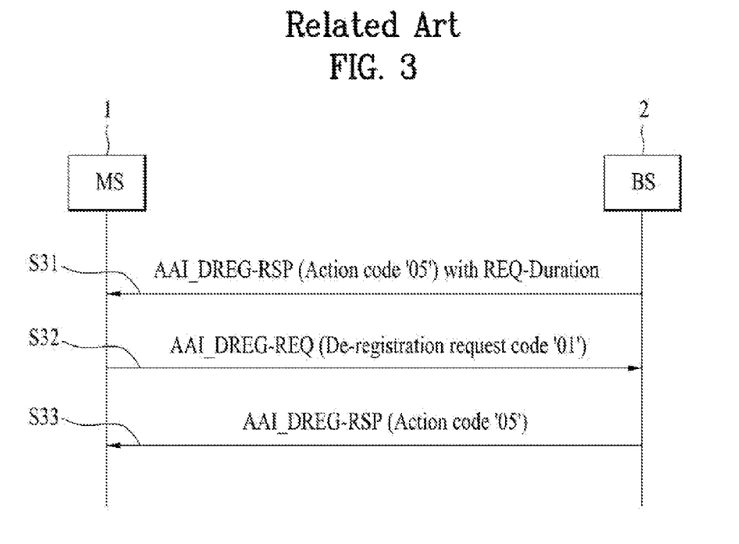
FIG. 3 is a flow chart illustrating a process of transitioning to an idle mode by Type 2 ABS initiation according to the related art.

FIG. 3 is a flow chart illustrating a process of transitioning to an idle mode by Type 2 ABS initiation according to the related art.

With reference to FIG. 3, the base station transmits a DREG-RSP message including an action code '05' along with an REQ-Duration to the terminal in order to instruct the terminal to transition to an AMS initiated idle mode (step S31). Upon receiving the DREG-RSP message, the terminal transmits a DREG-REQ message including a deregistration request code '01' to the base station before an REQ-Duration timer expires in response thereto (step S32). Upon receiving the DREG-REQ message, the base station transmits a DREG-RSP message including an action code '05' allowing the terminal to transition to an idle mode, to the terminal (step S33).

Figure 4:
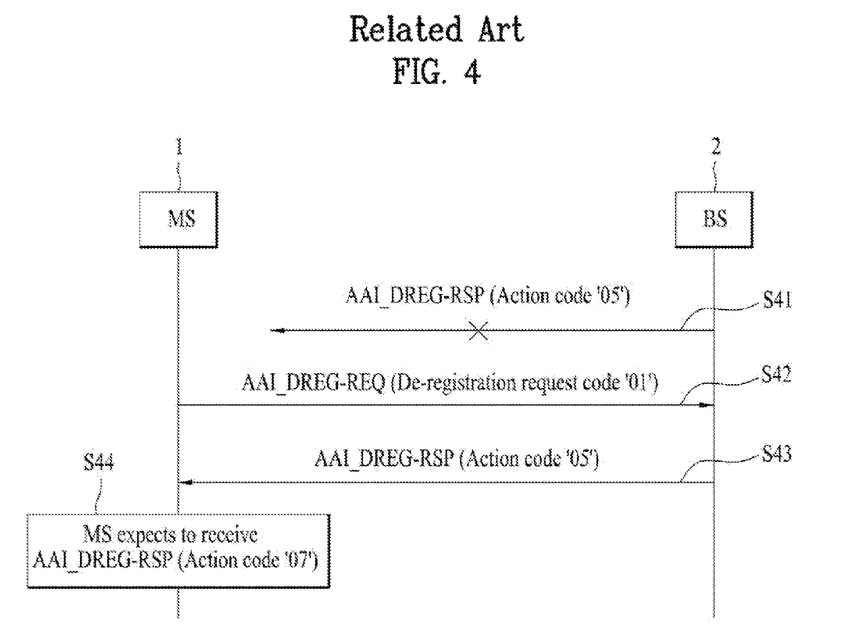
FIG. 4 is a flow chart illustrating a situation in which the DREG-RSP message is lost during the process of transitioning to an idle mode by Type 2 ABS initiation according to the related art.

FIG. 4 is a flow chart illustrating a situation in which the DREG-RSP message is lost during the process of transitioning to an idle mode by Type 2 ABS initiation according to the related art.

During the Type 2 ABS initiated idle mode entry process, the base station transmits a DREG-RSP message including the action code '05' instructing the terminal to transition to the AMS initiated idle mode, to the terminal. Here, it may happen that the DREG-RSP message is lost while being transmitted and the terminal transmits the DREG-REQ message including the deregistration request code '01' requesting a transition to an idle mode to the base station (step S42).

In this case, the base station may consider an AAI_DREG-REQ (including the deregistration request code '01') message received from the terminal as a response to an unsolicited AAI_DREG-RSP (including the action code '05') the base station has transmitted to the terminal, and transmits an AAI_DREG-RSP (including the action code '05') to the terminal in response thereto (step S43).

However, the terminal has not received the AAI_DREG-RSP (including the action code '05') the base station had transmitted, the terminal expects to receive an AAI_DREG-RSP (including an action code '07') from the base station (step S44). In this case, there is delay during the process of transitioning to an idle mode of the terminal.

DISCLOSURE

Technical Problem

Therefore, an object of the present invention is to provide a method for controlling a transition to an idle mode by using an MCEH in which a poll bit is set.

Technical Solution

According to an aspect of the present invention, there is provided a method of controlling a transition to an idle mode in an operation method for transitioning to an idle mode in a wideband wireless communication system, including: receiving an unsolicited deregistration response message including an action code instructing the terminal to transmit a deregistration request message for a transition to an idle mode and deregistration request message transmission time information from a base station; extracting control information in which a poll bit for reporting whether or not a message has been received is set from the received unsolicited deregistration response message; transmitting a deregistration request message including response information with respect to the extracted control information and a deregistration request code for requesting a transition to an idle mode, to the base station; and receiving a deregistration response message including an action code permitting a transition to an idle mode, from the base station.

The control information may be a MAC control extended header.

The response information may be a MAC control message ACK extended header.

The transmission time information may be REQ-Duration.

According to another aspect of the present invention, there is provided a method of controlling a transition to an idle mode in an operation method of a base station for controlling a transition of a terminal to an idle mode in a wideband wireless communication system, including: transmitting an unsolicited deregistration response message to the terminal; receiving a deregistration request message including a deregistration request code for requesting a transition to an idle mode from the terminal; and determining whether or not response information with respect to the control information is included in the received deregistration request message, wherein the unsolicited deregistration response message includes at least one of control information in which a poll bit for reporting whether or not a message has been received, an action code instructing the terminal to transmit a deregistration request message for a transition to an idle mode, and the deregistration request message transmission time information.

The control information may be a MAC control extended header, the response information may be a MAC control message ACK extended header, and the transmission time information may be REQ-Duration.

The method may further include: transmitting a deregistration response message including an action code permitting a transition to an idle mode to the terminal.

The method may further include: re-transmitting the unsolicited deregistration response message, which has been transmitted to the terminal, when the response information is not included in the received deregistration request message.

In the re-transmitting of the unsolicited deregistration response message, the unsolicited deregistration response message may be repeatedly transmitted until such time as a re-transmission count reaches a maximum count.

The method may further include: after the unsolicited deregistration response message is repeatedly transmitted up to the maximum count, when there is no response information received from the terminal with respect to the control information, deleting the terminal from a management list of the base station.

According to another aspect of the present invention, there is provided a method of controlling a transition to an idle mode in an operation method for transitioning to an idle mode in a wideband wireless communication system, including: receiving an unsolicited deregistration response message including an action code instructing the terminal to transmit a deregistration request message for a transition to an idle mode and deregistration request message transmission time information from a base station; extracting control information in which a poll bit for reporting whether or not a message has been received is set from the received unsolicited deregistration response message; transmitting a response message with respect to the extracted control information to the base station; transmitting a deregistration request message including a deregistration request code for requesting a transition to an idle mode, to the base station; and receiving a deregistration response message including an action code permitting a transition to an idle mode, from the base station.

The control information may be a MAC control extended header, the response message may be an MSG-ACK message, and the transmission time information may be REQ-Duration.

Advantageous Effects

According to embodiments of the present invention, since an MCEH in which a poll bit is set is included in a first message, namely, an unsolicited deregistration response message or a deregistration request message, and transmitted, whether or not a message has been lost can be easily known.

BEST MODES

Reference will, now be made in detail to the preferred embodiments of this specification, examples of which are illustrated in the accompanying drawings. It should be understood that the description herein will be given of essential parts required to understand operations according to this specification and description of the other parts will be omitted to obviate obscurity of the point of the invention.

This specification proposes a method for controlling transition to an idle mode of a terminal, for example, which employs Institute of Electrical and Electronics Engineers (IEEE) 802.16 standard (hereinafter, referred to as IEEE 802.16 communication system).

The detailed description will be given of method for controlling transition to an idle mode of a terminal, for example, in the IEEE 802.16 communication system. However, the method for controlling transition to an idle mode of a terminal given by the detailed description may also be applicable to other communication systems as well as the IEEE 802.16 communication system.

The exemplary embodiments herein are combinations of components and characteristics in certain forms. Each component or characteristic should be considered to be optional unless being explicitly described. Each component or characteristic may be embodied in the form of non-combination with other components or characteristics. Also, the exemplary embodiments can be implemented by combination of part of components and/or characteristics. The sequence of operations described in the exemplary embodiments may differ. Part of configurations or characteristics in one exemplary embodiment will be included in another exemplary embodiment, or be replaced with corresponding configurations or characteristics in another embodiment.

The exemplary embodiments in this specification are described herein on the basis of relation of data transmission and reception between a base station and a terminal. Here, the base station may indicate a terminal node of a network, which performs communications directly with the terminal. Specific operations, which will be described as being performed by the base station in this specification, may be performed by an upper node of the base station.

That is, it is obvious that in a network comprising a plurality of network nodes including the base station, various operations performed for communications with the terminal can be performed by the base station or different network nodes other than the base station. 'Base station' will be replaced with other terms, such as a fixed station, Node B, eNode B (eNB), access point and the like. Also, 'terminal' may be replaced with other terms, such as user equipment (UE), mobile station (MS), mobile subscriber station (MSS) and the like.

The exemplary embodiment described herein may be embodied by various means. For example, the exemplary embodiments may be implemented by hardware, firmware, software, or combination of them.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors.

For firmware or software implementation, the method according the exemplary embodiments described herein may be implemented in the form of module, procedure, function or the like, which performs functions or operations described above. Software codes may be stored in a memory unit to be operated by a processor. The memory unit may be present inside or outside the processor, to exchange (transceiver) data with the processor via various means, which have been already known.

Specific terms used in the following description are provided for better understanding of the specification, and use of such terms may be changed into different forms within the scope of this invention.

MAEH (Mac Control Message ACK Extended Header) Based Idle Mode Entry

Hereinafter, various embodiments demonstrating an idle mode transition process using an MCEH and an MAEH will be described.

First Embodiment

In a first embodiment, an idle mode transition control method using an MCEH and an MAEH according to an embodiment of the present disclosure is provided.

Figure 5:
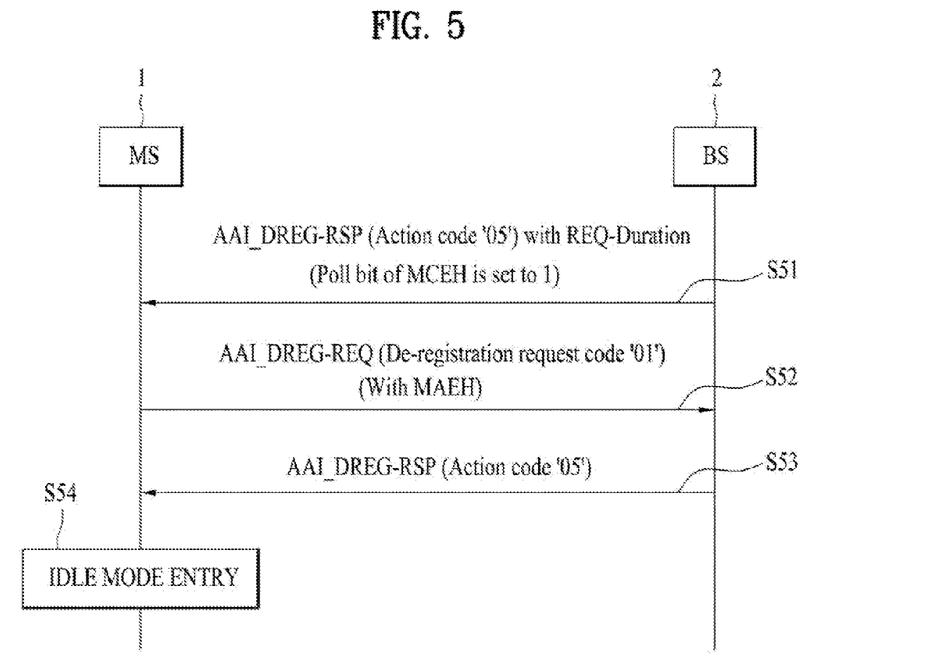
FIG. 5 is a flow chart illustrating a procedure of a Type 2 ABS initiated idle mode entry according to a first embodiment of the present invention.

FIG. 5 is a flow chart illustrating a procedure of a Type 2 ABS initiated idle mode entry according to a first embodiment of the present invention.

First, a terminal receives an unsolicited deregistration response (DREG-RSP) message including an action code '05' instructing the terminal to transmit a deregistration request (DREG-REQ) message for a transition to an idle mode and deregistration request message transmission time information (or information regarding a time for transmitting the deregistration request message) from a base station (step S51). Here, the time information refers to a time interval between a point in time at which the BS transmits the unsolicited deregistration response message to the terminal to a point in time at which the DREG-REQ message is transmitted from the terminal. The time information may be REQ-Duration.

Next, the terminal extracts control information in which a poll bit for reporting whether or not a message has been received is set, from the received unsolicited deregistration response message. Here, for example, the poll bit may be set to '1'. Also, the control information may be a MAC control extended header (MCEH). Namely, the unsolicited deregistration response message includes the MCEH in which a poll bit is set.

And then, the terminal transmits a deregistration request message including response information with respect to the extracted control information and a deregistration request code '01' for requesting a transition to an idle mode to the base station (step S52). Here, the response information is a response indicating whether or not the unsolicited deregistration response message transmitted from the base station has been received. The response information may be a MAC control message ACK extended header (MAEH). Namely, when the unsolicited deregistration response message is received, the terminal transmits the deregistration request (DREG-REQ) message including the MAEH to the base station.

Thereafter, the terminal receives a deregistration response (DREG-RSP) message including an action code '07' permitting a transition to an idle mode from the base station (step S53). Namely, when the terminal receives the deregistration response message including the action code '07, the terminal transitions to an idle mode (step S54).

Second Embodiment

In a second embodiment, an idle mode transition method using the MCEH and the MAEH according to an embodiment of the present invention when a DREG-RSP message transmitted from the base station is lost is provided.

Figure 6:
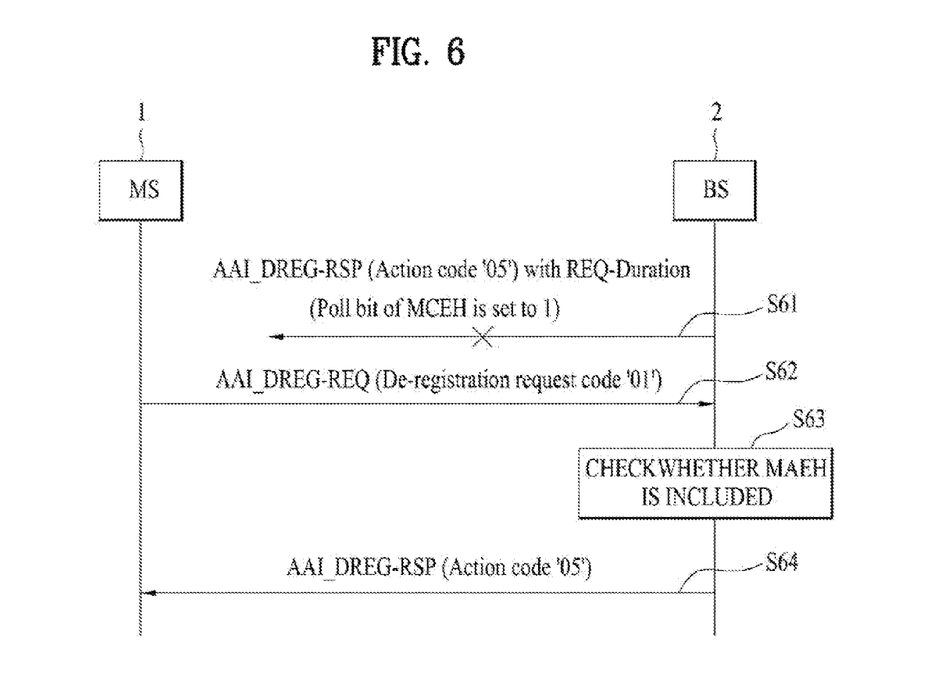
FIG. 6 is a flow chart illustrating a procedure of a Type 2 ABS initiated idle mode entry according to a second embodiment of the present invention.

FIG. 6 is a flow chart illustrating a procedure of a Type 2 ABS initiated idle mode entry according to a second embodiment of the present invention.

First, the base station transmits an unsolicited DREG-RSP message to the terminal (step S61). Here, the unsolicited deregistration response message includes at least one of control information in which a poll bit for reporting whether or not a message has been received is set, an action code '05 instructing the terminal to transmit a deregistration request message for a transition to an idle mode, and information regarding a time for transmitting the deregistration request message. For example, the poll bit may be set to '1'.

Also, the control information may be a MAC Control Extended Header (MCEH). Namely, the unsolicited deregistration response message includes an MCEH including a poll bit set therein.

Also, the time information refers to a time interval between a point in time at which the BS transmits the unsolicited deregistration response message to the terminal to a point in time at which the DREG-REQ message is transmitted from the terminal. The time information may be REQ-Duration.

Next, the base station receives a deregistration request message including the action code '01' to request a transition to an idle mode from the terminal (step S62). Here, the deregistration request message may be a deregistration request message DREG-REQ corresponding to an unsolicited deregistration response message the base station has transmitted to the terminal or a deregistration request message (DREG-REQ) the terminal has solely transmitted to perform an AMS initiated idle mode entry.

And then, the base station checks whether or not the received deregistration request message includes response information with respect to the control information (step S63). Here, the response information may be a MAC Control Message ACK Extended Header.

Upon checking, when response information is included in the received deregistration request message, the deregistration request message received from the terminal is a deregistration request message DREG-REQ corresponding to the unsolicited deregistration response message the base station has transmitted to the terminal. However, upon checking, when the response information is not included, the deregistration request message received from the terminal is a deregistration request message DREG-REQ the terminal has solely transmitted to perform MS initiated idle mode entry.

With reference to FIG. 6, since the unsolicited deregistration response message the base station transmitted has been lost midway, the deregistration request message received from the terminal corresponds to a deregistration request message DREG-REQ the terminal has solely transmitted to perform the AMS initiated idle mode entry Thereafter, upon checking, when response information is not included in the received deregistration request message, the base station transmits a deregistration response message including the action code '07' permitting a transition to an idle mode in response to the deregistration request message the terminal has solely transmitted (step S64).

Third Embodiment

In a third embodiment, a method of transitioning to an idle mode using the MCEH or the MAEH according to another embodiment of the present disclosure when the DREG-RSP message the base station has transmitted is lost is provided.

Figure 7:
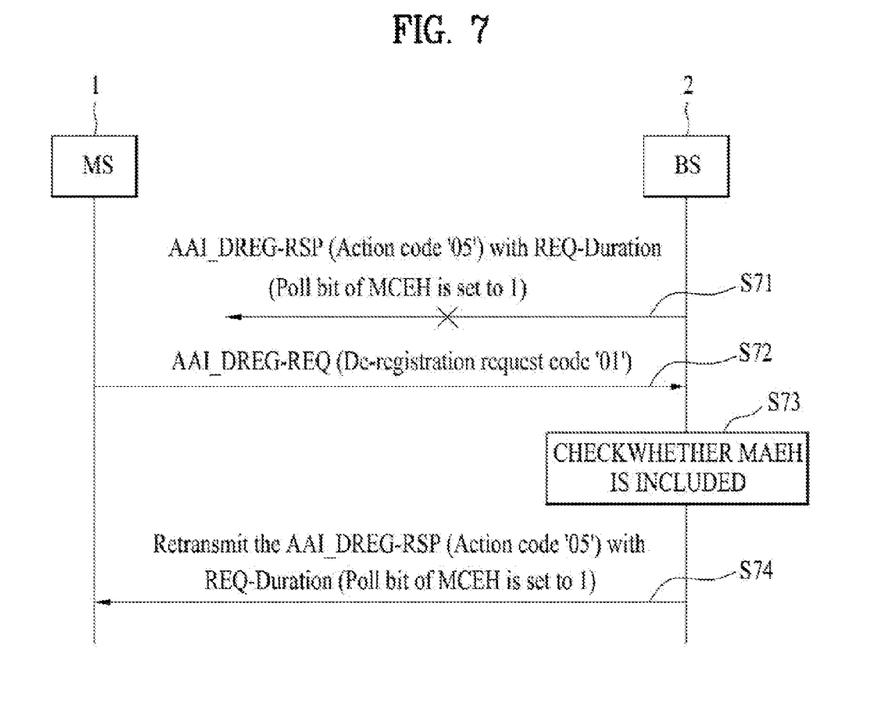
FIG. 7 is a flow chart illustrating a procedure of a Type 2 ABS initiated idle mode entry according to a third embodiment of the present invention.

FIG. 7 is a flow chart illustrating a procedure of a Type 2 ABS initiated idle mode entry according to a third embodiment of the present invention.

Steps S71 to S73 in FIG. 7 are the same as the operation of steps S61 to S63 in FIG. 6, so, a description thereof will be omitted.

Next, upon checking, when response information is not included, the base station re-transmits the unsolicited deregistration response message to the terminal (step S74). The base station disregards the deregistration request message including the action code '01' to request a transition to an idle mode received from the terminal. Namely, the base station does not respond to the deregistration request message.

Here, when response information is received from the terminal according to the re-transmission result, the base station transmits a deregistration response message including the action code '07' permitting a transition to an idle mode to the terminal. Here, the base station repeatedly re-transmits the unsolicited deregistration response message, which has been transmitted to the terminal, until such time as a re-transmission count reaches a pre-set maximum count.

Thereafter, if response information is not received from the terminal although the base station has re-transmitted the unsolicited deregistration response message, the base station determines that a channel situation is not good, and deletes the terminal from a managed list. In this case, a paging controller also deletes the terminal from a list it manages.

Fourth Embodiment

In a fourth embodiment, a method of transitioning to an idle mode by AMS initiation using an MCEH and an MAEH according to another embodiment of the present invention is provided.

Figure 8:
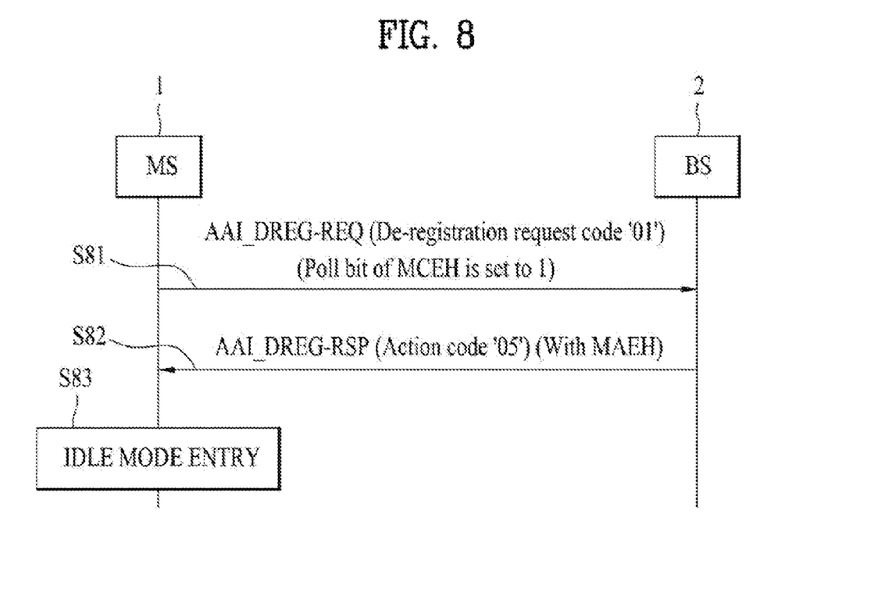
FIG. 8 is a flow chart illustrating a procedure of an AMS initiated idle mode entry according to a fourth embodiment of the present invention.

FIG. 8 is a flow chart illustrating a procedure of an AMS initiated idle mode entry according to a fourth embodiment of the present invention.

First, the terminal transmits a deregistration request message including control information in which a poll bit for reporting whether or not a message has been received is set and the action code '01' for requesting a transition to an idle mode, to the base station (step S81). For example, the poll bit may be set to '1'. Also, the control information may be a MAC Control Extended Header (MCEH). Namely, the DREG-REQ message includes the MCEH in which a poll bit is set.

Next, the terminal receives a deregistration response (DREG-RSP) message including response information with respect to the control information and the action code '07' permitting a transition to an idle mode from the base station (step S82). Namely, after the terminal receives the deregistration response message including the action code "07", it transitions to an idle mode (step S83).

Here, the response message may be a response indicating whether or not the deregistration request message transmitted to the base station has received. The response information may be a MAC Control Message ACK Extended Header (MAEH). Namely, after the terminal transmits the deregistration request message to the base station, the terminal receives the deregistration response (DREG-RSP) message including the MAEH from the base station.

Fifth Embodiment

In a fifth embodiment, a method of transitioning to an idle mode according to Type 1 ABS initiated idle mode entry using an MAEH and an AAI_MSG-ACK according to another embodiment of the present disclosure is provided.

Figure 9:
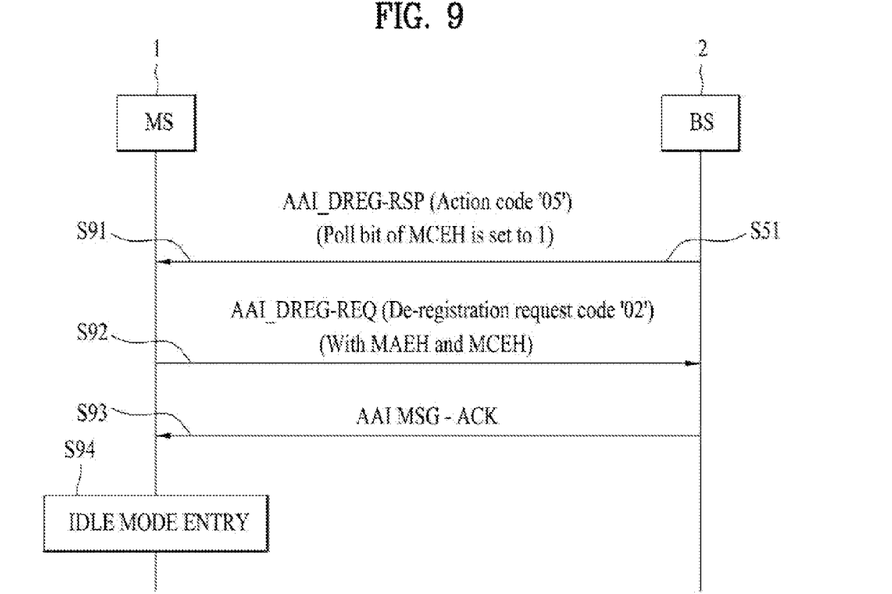
FIG. 9 is a flow chart illustrating a procedure of a Type 1 ABS initiated idle mode entry according to a fifth embodiment of the present invention.

FIG. 9 is a flow chart illustrating a procedure of a Type 1 ABS initiated idle mode entry according to a fifth embodiment of the present invention.

First, the terminal receives an unsolicited DREG-RSP message including the action code '05' instructing the terminal to transmit a deregistration request (DREG-REQ) message for a transition to an idle mode (step S91). The received unsolicited deregistration response message does not include REQ-Duration indicating time information. The time information refers to a time interval from a point in time at which the base station transmits the unsolicited deregistration response message to the terminal to a point in time at which the DREG-REQ message is transmitted from the terminal.

Next, the terminal extracts first control information in which a poll bit for reporting whether or not a message has been received is set, from the received unsolicited deregistration response message. For example, the poll bit may be set to be '1'. Also, the first control information may be a MAC Control Extended Header (MCEH). Namely, the unsolicited deregistration response message includes the MCEH in which a poll bit is set.

Next, the terminal transmits a deregistration request message including response information with respect to the extracted first control information, second control information in which a poll bit for reporting whether or not a message has been received is set, and the action code '02' instructing the base station to respond to the unsolicited deregistration response message to the base station (step S92).

Here, the response information may be a response indicating whether or not the unsolicited deregistration response message transmitted from the base station has been received. The response information may be an MAC Control Message ACK Extended Header (MAEH). Namely, when the terminal receives the unsolicited deregistration response message, the terminal transmits a deregistration request (DREG-REQ) message including the MAEH to the base station. Here, the first and second control information may be an MCEH.

Next, the terminal receives a response message with respect to the second control information from the base station (step S93). Here, the response message may be an MSG-ACK message.

Thereafter, when the terminal receives the response message, the terminal transitions to an idle mode (step S94).

AAI MSG-ACK Based Idle Mode Entry

Hereinafter, various embodiments demonstrating a process of transitioning to an idle mode using an MCEH and an AAI_MSG-ACK message will be described.

Sixth Embodiment

In a sixth embodiment, a method for determining whether or not the terminal has successfully received an AAI_DREG-RSP message (action code=0x05) the base station transmitted through an AAI_MSG-ACK message according to an embodiment of the present disclosure is provided.

Figure 10:
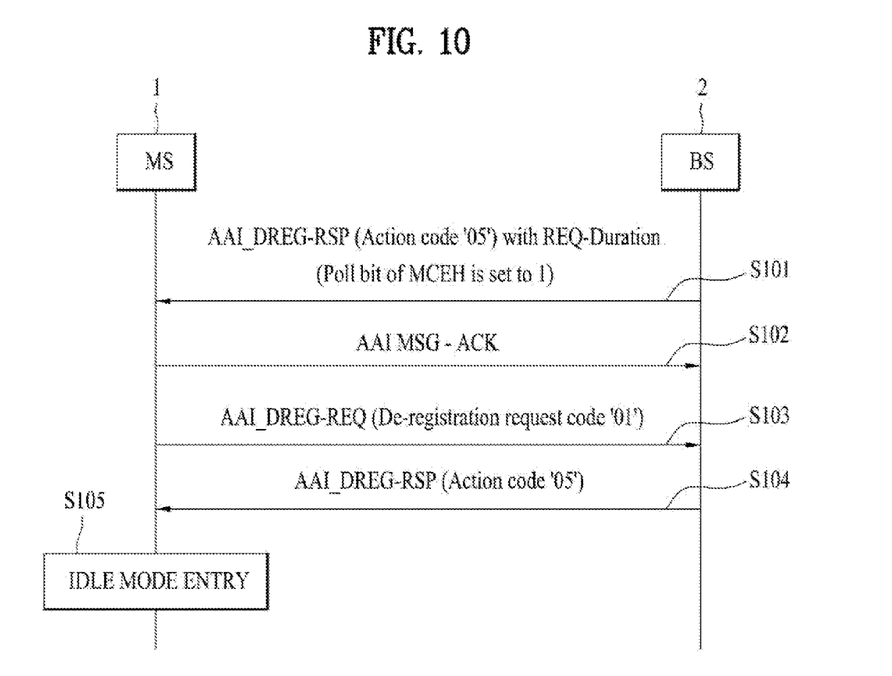
FIG. 10 is a flow chart illustrating a procedure of a Type 2 ABS initiated idle mode entry according to a sixth embodiment of the present invention.

FIG. 10 is a flow chart illustrating a procedure of a Type 2 ABS initiated idle mode entry according to a sixth embodiment of the present invention.

First, the terminal receives an unsolicited deregistration response (DREG-RSP) message including an action code '05' instructing the terminal to transmit a deregistration request (DREG-REQ) message for a transition to an idle mode and the deregistration request message transmission time information (step S101). Here, the time information refers to a time interval between a point in time at which the BS transmits the unsolicited deregistration response message to the terminal to a point in time at which the DREG-REQ message is transmitted from the terminal. The time information may be REQ-Duration.

Next, the terminal extracts control information in which a poll bit is set from the received unsolicited deregistration response message to report the reception of the message. Here, for example, the poll bit may be set to '1'. Also, the control information may be a MAC control extended header (MCEH). Namely, the unsolicited deregistration response message includes the MCEH in which a poll bit is set.

And then, the terminal transmits a response message with respect to the extracted control information to the base station (step S102). Here, the response information is a message indicating a response indicating whether or not the unsolicited deregistration response message transmitted from the base station has been received. The response information may be an MSG-ACK message. Namely, when the unsolicited deregistration response message is received from the base station, the terminal transmits an MSG-ACK message in response to the reception.

The terminal transmits a deregistration request message including the action code '01' for requesting a transmission to an idle mode to the base station (step S103).

Thereafter, the terminal receives a deregistration response (DREG-RSP) message including an action code '07' permitting a transition to an idle mode from the base station (step S104). Namely, when the terminal receives the deregistration response message including the action code '07, the terminal transitions to an idle mode (step S105).

Seventh Embodiment

In a seventh embodiment, an idle mode transition method using the AAI_MSG-ACK message according to an embodiment of the present invention when a DREG-RSP message transmitted from the base station is lost is provided.

Figure 11:
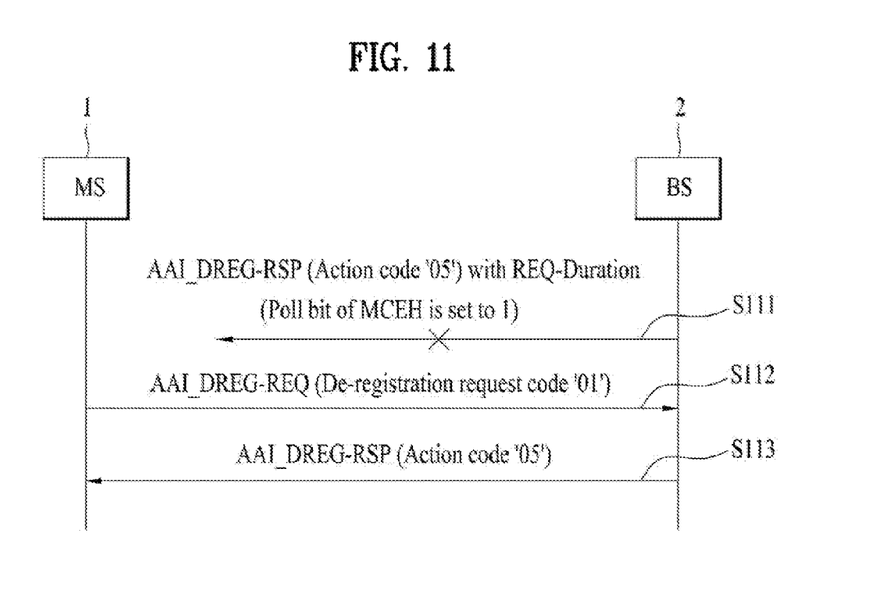
FIG. 11 is a flow chart illustrating a procedure of a Type 2 ABS initiated idle mode entry according to a seventh embodiment of the present invention.

FIG. 11 is a flow chart illustrating a procedure of a Type 2 ABS initiated idle mode entry according to a seventh embodiment of the present invention.

First, the base station transmits an unsolicited DREG-RSP message to the terminal (step S111). Here, the unsolicited deregistration response message includes at least one of control information in which a poll bit for reporting whether or not a message has been received is set, an action code '05 instructing the terminal to transmit a deregistration request message for a transition to an idle mode, and information regarding a time for transmitting the deregistration request message. For example, the poll bit may be set to '1'.

Also, the control information may be a MAC Control Extended Header (MCEH). Namely, the unsolicited deregistration response message includes an MCEH including a poll bit set therein.

Also, the time information refers to a time interval between a point in time at which the BS transmits the unsolicited deregistration response message to the terminal to a point in time at which the DREG-REQ message is transmitted from the terminal. The time information may be REQ-Duration.

Next, the base station receives a deregistration request message including the action code '01' to request a transition to an idle mode from the terminal (step S112). Here, the deregistration request message is a deregistration request message DREG-REQ corresponding to the unsolicited deregistration response message when the unsolicited registration response message has been transmitted to terminal without being lost in the midway. However, when the unsolicited deregistration response message is lost while being transmitted to the terminal, the deregistration request message corresponds to a deregistration request message DREG-REQ the terminal has solely transmitted to perform AMS initiated idle mode entry.

With reference to FIG. 11, since the unsolicited deregistration response message transmitted from the base station has been lost, the deregistration request message received from the terminal corresponds to the deregistration request message DREG-REQ transmitted from the terminal solely in order to perform AMS initiated idle mode entry.

Next, the base station transmits a deregistration response message including the action code '07' permitting a transition to an idle mode in response to the deregistration request message transmitted from the terminal solely.

Eighth Embodiment

In an eighth embodiment, a method of transitioning to an idle mode using AAI_MSG-ACK message according to another embodiment of the present disclosure when the DREG-RSP message the base station has transmitted is lost is provided.

Figure 12:
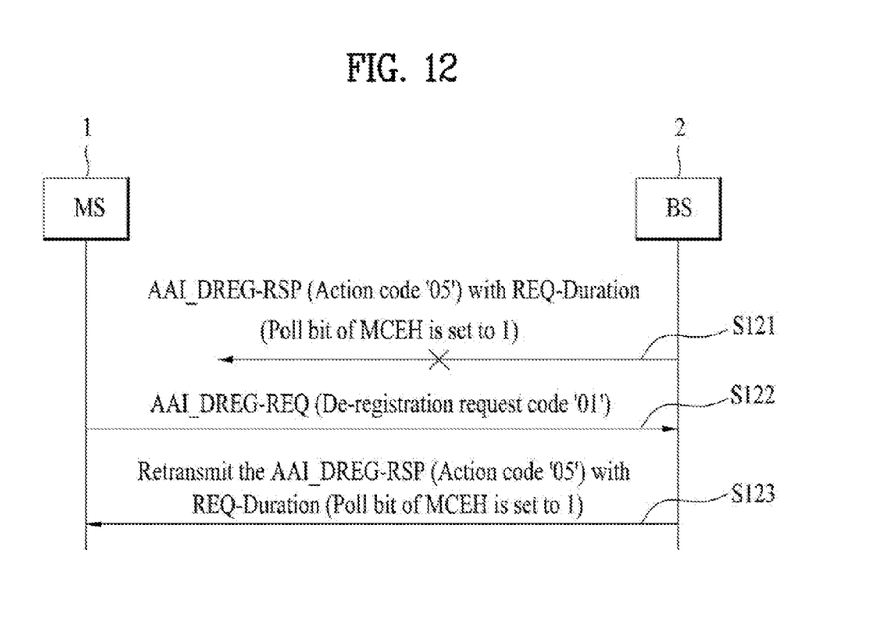
FIG. 12 is a flow chart illustrating a procedure of a Type 2 ABS initiated idle mode entry according to an eighth embodiment of the present invention.

FIG. 12 is a flow chart illustrating a procedure of a Type 2 ABS initiated idle mode entry according to an eighth embodiment of the present invention.

Steps S111 and S112 in FIG. 7 are the same as the operation of steps S111 and S112 in FIG. 12, so, a description thereof will be omitted.

Next, the base station re-transmits repeatedly the unsolicited deregistration response message, which has been transmitted to the terminal, until such time as a re-transmission count reaches a pre-set maximum count (step S123). The base station disregards the deregistration request message including the action code '01' to request a transition to an idle mode received from the terminal. Namely, the base station does not respond to the deregistration request message.

Here, when response information is received from the terminal according to the re-transmission result, the base station transmits a deregistration response message including the action code '07' permitting a transition to an idle mode to the terminal. Here, the response message refers to an MSG-ACK message.

Thereafter, if response information is not received from the terminal although the base station has re-transmitted the unsolicited deregistration response message, the base station determines that a channel situation is not good, and deletes the terminal from a managed list. In this case, a paging controller also deletes the terminal from a list it manages.

Ninth Embodiment

In a ninth embodiment, a method of transitioning to an idle mode by AMS initiation using an AAI_MSG-ACK message according to another embodiment of the present invention is provided.

Figure 13:
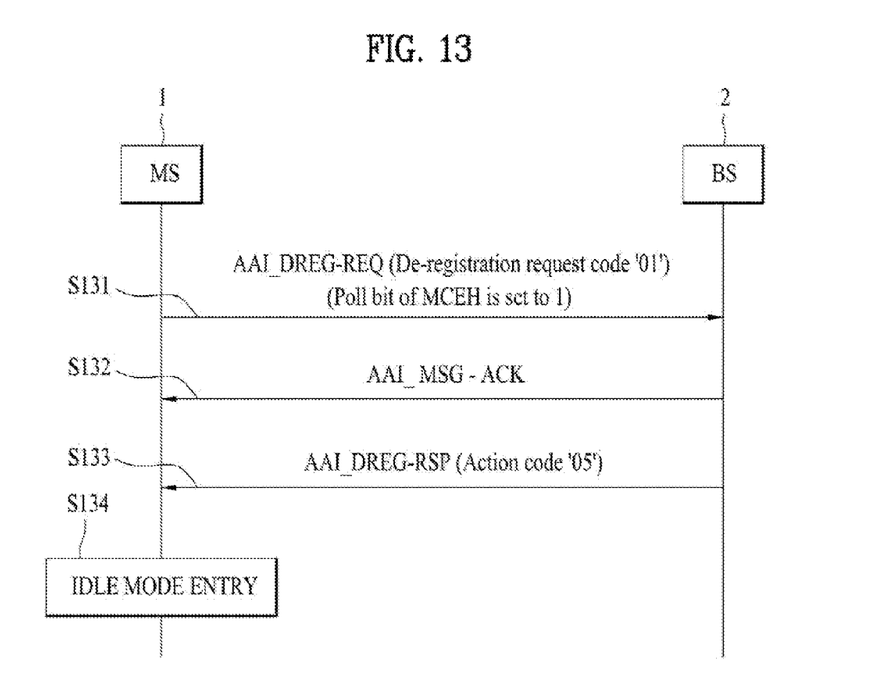
FIG. 13 is a flow chart illustrating a procedure of an AMS initiated idle mode entry according to a ninth embodiment of the present invention.

FIG. 13 is a flow chart illustrating a procedure of an AMS initiated idle mode entry according to a ninth embodiment of the present invention.

First, the terminal transmits a deregistration request message including control information in which a poll bit for reporting whether or not a message has been received is set and the action code '01' for requesting a transition to an idle mode, to the base station (step S131). For example, the poll bit may be set to '1'. Also, the control information may be a MAC Control Extended Header (MCEH). Namely, the DREG-REQ message includes the MCEH in which a poll bit is set.

Next, the terminal receives a response message with respect to the control information from the base station (step S132). Here, the response message is a message indicating a response with respect to whether or not the deregistration request message transmitted to the base station has been received. The response message may be an MSG-ACK message. Namely, after the terminal transmits the deregistration request message to the base station, the terminal receives the MSG-ACK message.

Next, the terminal receives a deregistration response (DREG-RSP) message including the action code '07' permitting a transition to an idle mode from the base station (step S133). Namely, when the terminal receives the deregistration response message including the action code '07', the terminal transitions to an idle mode (step S134).

Tenth Embodiment

In a tenth embodiment, a method of transitioning to an idle mode according to Type 1 ABS initiated idle mode entry using an MAEH and an AAI_MSG-ACK according to another embodiment of the present disclosure is provided.

Figure 14:
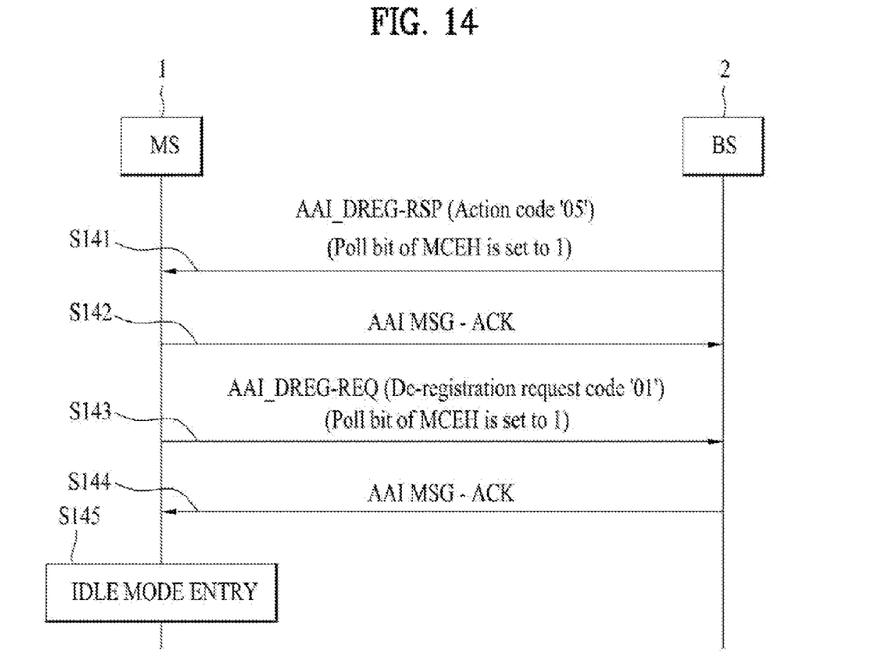
FIG. 14 is a flow chart illustrating a procedure of a Type 1 ABS initiated idle mode entry according to a tenth embodiment of the present invention.

FIG. 14 is a flow chart illustrating a procedure of a Type 1 ABS initiated idle mode entry according to a tenth embodiment of the present invention.

First, the terminal receives an unsolicited DREG-RSP message including the action code '05' instructing the terminal to transmit a deregistration request (DREG-REQ) message for a transition to an idle mode (step S141). The received unsolicited deregistration response message does not include REQ-Duration indicating time information. The time information refers to a time interval from a point in time at which the base station transmits the unsolicited deregistration response message to the terminal to a point in time at which the DREG-REQ message is transmitted from the terminal.

Next, the terminal extracts first control information in which a poll bit for reporting whether or not a message has been received is set, from the received unsolicited deregistration response message. For example, the poll bit may be set to be '1'. Also, the first control information may be a MAC Control Extended Header (MCEH). Namely, the unsolicited deregistration response message includes the MCEH in which a poll bit is set.

And then, the terminal transmits a first response message with respect to the extracted first control information to the base station (step S142). The first response message is a message indicating a response as to whether or not the unsolicited deregistration response message transmitted from the base station has been received. The first response message may be an MSG-ACK message. Namely, when the terminal receives the unsolicited deregistration response message, the terminal transmits the MSG-ACK message to the base station as an acknowledgement.

Thereafter, the terminal transmits a deregistration request message including the second control information in which a poll bit for reporting whether or not a message has been received is set and the action code '02' instructing the base station to respond to the unsolicited deregistration response message, to the base station (step S143). Here, the second control information may be an MCEH.

And then, the terminal receives second response message with respect to the second control information from the base station (step S144). The second response message may be an MSG-ACK message.

Thereafter, after the second response is received, the terminal transitions to an idle mode (step S145).

The invention claimed is:

1. A method of controlling a transition of a terminal to an idle mode by a base station in a wideband wireless communication system, the method comprising:
    transmitting an unsolicited deregistration response message to the terminal, the unsolicited deregistration response message including a MAC control extended header (MCEH) in which a poll bit for reporting whether or not a message has been received is set, an action code for instructing the terminal to transmit a deregistration request message for a transition to an idle mode, and the deregistration request message transmission time information;
    receiving the deregistration request message including a deregistration request code for requesting a transition to an idle mode from the terminal; and
    determining whether or not response information with respect to the poll bit is included in a MAC control message ACK extended header (MAEH) of the received deregistration request message;
    transmitting, to the terminal, a first deregistration response message including a first action code which permits the terminal to transit into the idle mode according to an unsolicited deregistration mode, when the response information is included in the MAEH of the received deregistration request message; and
    transmitting, to the terminal, a second deregistration response message including a second action code which permits the terminal to transit into the idle mode according to a solicited deregistration mode, when the response information is not included in the MAEH of the received deregistration request message.

2. The method of claim 1, wherein the transmission time information is REQ-Duration.

3. A base station for controlling a transition of a terminal to an idle mode in a wideband wireless communication system, the base station configured to:
    transmit an unsolicited deregistration response message to the terminal, the unsolicited deregistration response message including a MAC control extended header (MCEH) in which a poll bit for reporting whether or not a message has been received is set, an action code for instructing the terminal to transmit a deregistration request message for a transition to an idle mode, and the deregistration request message transmission time information;
    receive the deregistration request message including a deregistration request code for requesting a transition to an idle mode from the terminal; and
    determine whether or not response information with respect to the poll bit is included in a MAC control message ACK extended header (MAEH) of the received deregistration request message;
    transmit, to the terminal, a first deregistration response message including a first action code which permits the terminal to transit into the idle mode according to an unsolicited deregistration mode, when the response information is included in the MAEH of the received deregistration request message; and
    transmit, to the terminal, a second deregistration response message including a second action code which permits the terminal to transit into the idle mode according to a solicited deregistration mode, when the response information is not included in the MAEH of the received deregistration request message.

4. The base station of claim 3, wherein the transmission time information is REQ-Duration.

* * * * *